US005907759A

United States Patent [19]
Yashiro

[11] Patent Number: 5,907,759
[45] Date of Patent: May 25, 1999

[54] AUTOMATIC ORIGINAL FEEDING APPARATUS CAPABLE OF DETECTING DELAY IN FEEDING AN ORIGINAL AND DELAYING FEED OF SUBSEQUENT ORIGINALS

[75] Inventor: Masahiko Yashiro, Yokohama, Japan

[73] Assignee: Canon Kabushiki Kaisha, Tokyo, Japan

[21] Appl. No.: 08/633,035

[22] Filed: Apr. 16, 1996

[30] Foreign Application Priority Data

Apr. 18, 1995 [JP] Japan ................................. 7-092619

[51] Int. Cl.$^6$ ................................................ G03G 21/00
[52] U.S. Cl. ...................... 399/371; 271/3.06; 271/3.09; 271/3.15
[58] Field of Search ................................ 399/367, 371, 399/372, 374; 271/3.06, 3.09, 3.15, 3.16

[56] References Cited

U.S. PATENT DOCUMENTS

4,579,444  4/1986  Pinckney et al. ....................... 399/372
5,018,716  5/1991  Yoshida et al. ...................... 399/367 X
5,323,219  6/1994  Hamanaka et al. ...................... 399/371
5,333,043  7/1994  Yamado ................................... 399/371
5,339,139  8/1994  Fullerton et al. .................... 399/367 X

*Primary Examiner*—Fred L. Braun
*Attorney, Agent, or Firm*—Fitzpatrick, Cella, Harper & Scinto

[57] ABSTRACT

An automatic original feeding apparatus includes an original reading portion, a first feeder disposed upstream of the original reading portion, and a second feeder capable of receiving two originals simultaneously. The second feeder is disposed downstream of the original reading portion, for turning up and resupplying the two originals one after another to the original reading portion. The apparatus also includes a third feeder for directing the two originals resupplied to the original reading portion to a discharge portion. The apparatus also includes a detector for detecting delay in conveyance of a succeeding original. A controller in the apparatus delays feeding of a succeeding original when the delay in conveyance is detected and introduces the succeeding original into the second feeder, after a preceding original in the second feeder is discharged from the second feeder.

27 Claims, 9 Drawing Sheets

AUTOMATIC ORIGINAL FEEDING APPARATUS CAPABLE OF DETECTING DELAY IN FEEDING AN ORIGINAL AND DELAYING FEED OF SUBSEQUENT ORIGINALS

BACKGROUND OF THE INVENTION

1. Field of the Invention

The present invention relates to an automatic original feeding apparatus, and more particularly, it relates to an automatic original feeding apparatus incorporated into an image reading apparatus such as a scanner or an image forming apparatus such as a copying machine, a printer and the like.

2. Related Background Art

In conventional automatic original feeding apparatuses incorporated into copying machines as image forming apparatuses or image reading apparatuses used as scanners, originals stacked on an original tray are successively supplied to an original reading position, and, after the reading, the originals are successively discharged. When images to be read are formed on both surfaces of the original, the original is automatically reverse-rotated or turned up and then the original is re-supplied to the reading position, thereby permitting the reading of the image on the back surface of the original.

In digital image forming apparatuses including recent digital reading apparatus (automatic original feeding apparatus) or a memory reserving apparatus (automatic original reading apparatus), it is difficult for the digital reading apparatus to read the image within a copying time of the image forming apparatus. To solve this problem, it is necessary to increase an original conveying speed of the reading apparatus and minimize a distance between adjacent originals to be conveyed. Further, in case of an original having images on both surfaces thereof, a time for turning up (reverse-rotating) the original from a first surface to a second surface must be minimized. Thus, in order to reverse-rotate the original, a U-turn reverse rotation is utilized, rather than a switch-back reverse rotation.

However, in the automatic original feeding apparatus, when plural originals are separated one by one to be supplied to the reading position, it takes a long time to feed out and separate the originals, thus not satisfying the time reduction requirements.

SUMMARY OF THE INVENTION

The present invention aims to eliminate the abovementioned conventional drawbacks, and has an object to provide an automatic original feeding apparatus, and an automatic original reading apparatus and an image forming apparatus having such an automatic original feeding apparatus, which can achieve high speed treatment.

An automatic original feeding apparatus according to the present invention comprises an original reading portion, a first feed means disposed upstream of the original reading portion, a second feed means disposed downstream of the original reading portion, a detection means for detecting delay in conveyance of a preceding original upstream of the original reading portion, and a control means for delaying a succeeding original when the delay in conveyance is detected.

Further, the present invention provides an automatic original feeding apparatus comprising an original reading portion, a first feed means disposed upstream of the original reading portion, a separation/supply means disposed upstream of the first feed means, a second feed means disposed downstream of the original reading portion, a detection means for detecting delay in conveyance of a preceding original upstream of the original reading portion, and a control means for delaying a succeeding original when the delay in conveyance is detected.

Furthermore, the present invention provides an automatic original feeding apparatus comprising an original reading portion, a first feed means disposed upstream of the original reading portion, a second feed means disposed downstream of the original reading portion to reverse-rotate an original and to re-supply the original to the original reading portion, a third feed means for directing the original re-supplied to the original reading portion to a discharge portion, a detection means for detecting delay in conveyance of a preceding original, and a control means for delaying a succeeding original when the delay in conveyance is detected.

In addition, the present invention provides an automatic original feeding apparatus comprising an original reading portion, a first feed means disposed upstream of the original reading portion, a separation/supply means disposed upstream of the first feed means, a second feed means disposed downstream of the original reading portion to reverse-rotate an original and to re-supply the original to the original reading portion, a third feed means for directing the original re-supplied to the original reading portion to a discharge portion, a detection means for detecting delay in conveyance of a preceding original, and a control means for delaying a succeeding original when the delay in conveyance is detected.

More specifically, when the original having conveyance delay and conveyed to a reverse rotation original convey path is a first original among two half-size originals (first original as the preceding original and second original as the succeeding original which can be simultaneously directed to the reverse rotation original convey path), the second original and other originals are also conveyance-delayed in correspondence to the conveyance delay of the first original.

On the other hand, when the original having conveyance delay and conveyed to the reverse rotation original convey path is the second original among two half-size originals (first original as the preceding original and second original as the succeeding original which can be simultaneously directed to the reverse rotation original convey path), the second original is stopped upstream of the reading position, and the first original is discharged from the reverse rotation original convey path, the second original and other originals are introduced into the reverse rotation original convey path.

With the arrangement as mentioned above, specifically, after the original supplied from the original stacking means and read at the reading position, when the original reversely rotated in the reverse rotation original convey path is re-supplied to the reading position and the other surface of the original is read, if the conveyed original does not reach the reading position at a predetermined timing to cause the conveyance delay, the next or succeeding original is decelerated upstream of the reading position to provide the conveyance delay or is stopped until the actual convey timing of the next original is achieved.

In this way, even if the conveyance delay is caused in the preceding original, collision or interference of the preceding original with respect to the next original at the reading position can be prevented. Further, even if the conveyance delay is caused in the both-face original among two half-size originals which can be simultaneously directed to the reverse rotation original convey path, the collision or interference of the preceding original with respect to the next original at the reading position can be prevented.

As mentioned above, according to the present invention, if the preceding original does not reach the reading position at the predetermined timing to cause the conveyance delay, since the next and other originals are delayed upstream of the reading position or are stopped temporarily, the proper distance between the originals can be maintained. As a result, the collision or interference between the original having the conveyance delay and the next original can be prevented at the reading position, thereby preventing damage of the originals.

DESCRIPTION OF THE PREFERRED EMBODIMENTS

The present invention will now be explained in connection with a first embodiment thereof with reference to the accompanying drawings.

Figure 1:
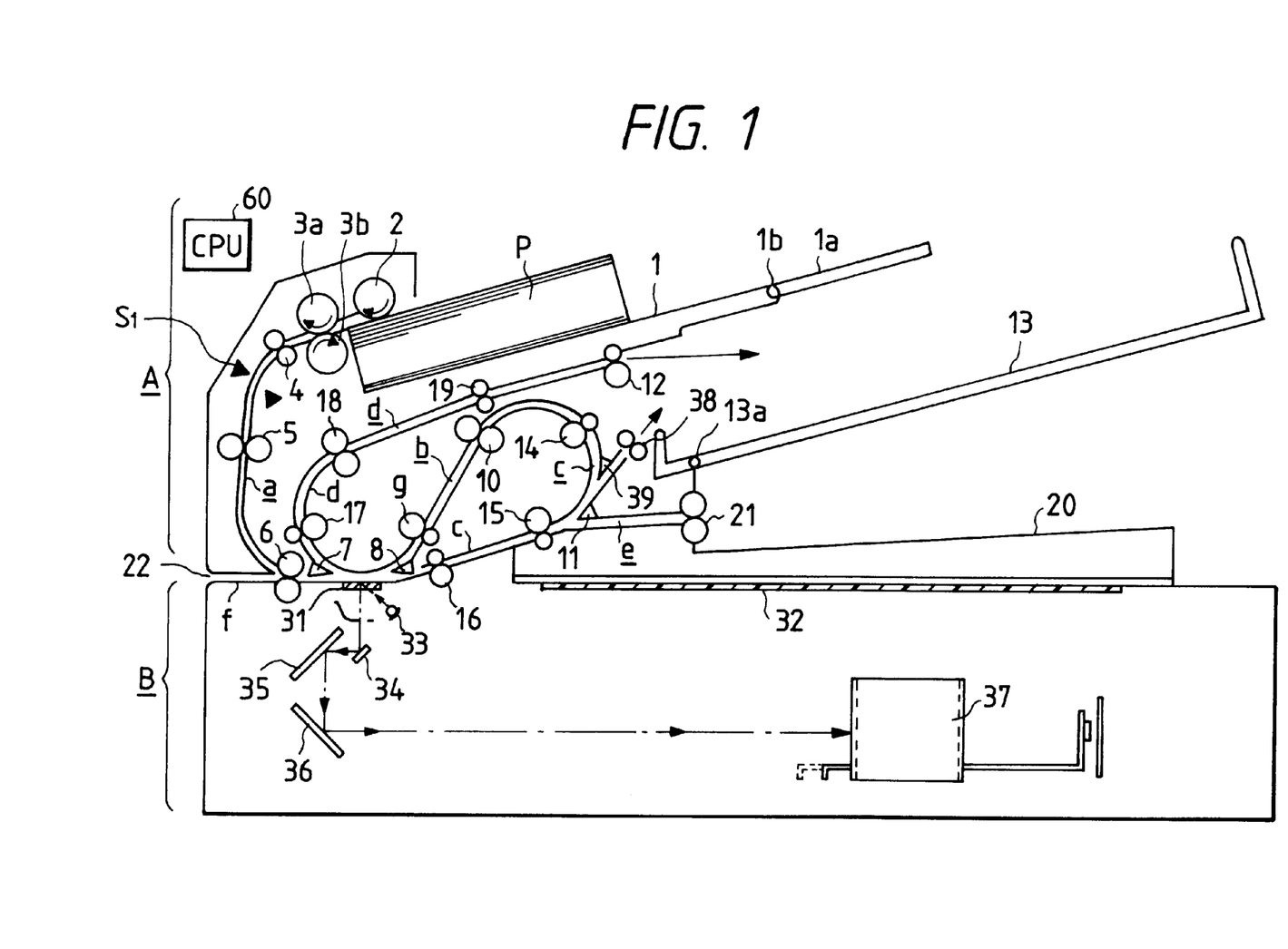
FIG. 1 is an elevational sectional view of an automatic original reading apparatus having an automatic original feeding apparatus according to a preferred embodiment the present invention.

In FIG. 1 schematically showing an automatic original feeding apparatus according to a first embodiment of the present invention, an automatic original feeding apparatus is generally designated by a symbol A and an image reading apparatus is generally designated by a symbol B. By using the automatic original feeding apparatus A and the image reading apparatus B together, normally, image information read from the original is inputted to a printer, a computer or the like through a cable and the like.

The automatic original feeding apparatus A is pivotally mounted on an upper surface of the image forming apparatus B, and FIG. 1 shows a condition that the automatic original feeding apparatus A is closed with respect the image forming apparatus B around a hinge portion provided at a rear side of the apparatus.

The image forming apparatus B includes two glass platens 31, 32 disposed on the upper surface of the apparatus and acting as first and second original reading portions (original reading positions). The first original reading portion (predetermined position) 31 is used for executing "flow reading" and the second original reading portion 32 is used for executing "fix reading". The apparatus B further includes an original reading system 33 to 37 which comprises an original illumination lamp 33 disposed below the first original reading portion 31 and acting as a reading means for reading image information on an original being conveyed, first to third scan mirrors 34, 35, 36 and a photoelectric reading unit 37. The automatic original feeding apparatus A can be opened with respect to the image forming apparatus B so that a book original can be rested on the glass platen 32. In this case, the illumination lamp 33 is shifted to the right to read the book original (fix reading).

The automatic original feeding apparatus A includes an original stacking tray (original stacking plate) 1 which acts as an original stacking portion and on which the originals are stacked with imaged surfaces thereof facing up. When the original is supplied, in response to an original supply start signal, a sheet supply roller 2 is rotated to contact an upper surface of the original stack P with a predetermined urging force. As a result, an uppermost original on the original stack P is subjected to a sheet supplying force from the sheet supply roller so that the originals are fed into the apparatus A. Thereafter, the uppermost original is separated from second and other originals by a pair of separation/supply rollers 3a, to 3b prevent the double-feed of originals, and the separated uppermost original enters a first original convey path (supply path) a. Pairs of original convey rollers 4, 5 and 6 are disposed in the first original convey path a.

Incidentally, the reference numeral 22 denotes a manual original insertion opening; and 20 denotes a discharge tray for an original manually inserted.

Next, original reading modes will be described.
(i) One-face reading mode (FIG. 1):

The original entered into the first original convey path a as mentioned above passes through below a first flapper 7 and is conveyed on the platen of the first original reading portion 31 while closely contacting the platen. Then, the original passes through below a second flapper 8 to enter into a third original convey path c and then passes through above a third flapper 11 and below a fourth flapper 39 to reach a pair of discharge rollers 38 by which the original is discharged onto a discharge tray (discharge portion) 13. Pair of original convey rollers 15, 16 are disposed in the third original convey path c. The original illumination lamp (reading means) 33 and the first to third scan mirrors 34, 35 and 36 of the original reading system of the image forming apparatus B is held at a position shown in FIG. 1 below the platen of the first original reading portion 31.

When the original is being conveyed on the platen of the first original reading portion 31 while closely contacting the platen, the imaged surface (facing down) of the original is illuminated by the original illumination lamp 33. Light reflected from the original surface is incident on the photoelectric reading unit 37 through the first to third scan mirrors 34, 35 and 36, thereby reading the image information on the original (one-face flow reading mode).

By repeating the above-mentioned operating cycle (separation, reading and discharge of the original), the one-face reading mode is performed for the originals stacked on the original stacking portion 1. Incidentally, the original supply start signals are emitted at a predetermined time interval on the basis of a size of the original and a predetermined distance between the originals. On the basis of the original supply start signals, pulse signals are inputted at a predetermined time interval. The size of the original is detected by an original size detection means (such as a sensor) provided on the original stacking tray.

(ii) Both-face reading mode (FIG. 1):

In a both-face reading mode for reading images on both surfaces of the original, first of all, in the above mode (i), when the original is passing through on the platen of the first original reading portion 31, the image on one surface (front surface) of the original is read. Then, the second flapper 8 is switched, so that the original is passed through above the second flapper 8 to enter into a second original convey path b. Then, the third flapper 11 is switched, so that the original is passed through above the third flapper 11 to enter into the third original convey path c, thereby reverse-rotating (turning-up) the original. Then, the original is passed through above the second flapper 8 (returned to its original position at this point) to reach the platen of the first original reading portion 31 again from a direction opposite to the direction regarding the above mode (i). Thereafter, the original is passed through above the first flapper 7 (already switched at this point) to enter into a fourth original convey path d and then is discharged onto the discharge tray 13 by the pair of discharge rollers 12.

The second original convey path b and the third original convey path c constitute a reverse rotation original convey path for turning up the original.

Incidentally, pairs of convey rollers 14, 15 and 16 are disposed in the third original convey path c, and pairs of convey rollers 17, 18 and 19 are disposed in the fourth original convey path d.

In the above original conveyance, when the turned-up original is passed on the platen of the first original reading portion 31 again while closely contacting with the platen, the image on the other surface (back surface) of the original is read by the original reading system 33 to 37 of the image forming apparatus B.

By repeating the above-mentioned operating cycle (separation, reading and discharge of the original), the both-face reading mode is performed for the originals P stacked on the original stacking portion 1. Incidentally, in this case, a distance between the large size originals has a predetermined time interval (determined by original size, distance between the originals, and a time duration during which the original is advancing in the reverse rotation original convey path). In case of the half-size originals, the first and second originals are determined by the size and the distance between the originals, and the third and other originals are determined in consideration of time durations during which the first and second originals are advancing in the reverse rotation original convey path.

On the other hand, in the automatic original feeding apparatus A, the originals are fed out by rotating the sheet supply roller 2 contacting the upper surface of the original stack P with the predetermined urging force. In this case, if slip is caused between the sheet supply roller 2 and the uppermost original on the original stack, the original P cannot be supplied at the predetermined timing. Further, regarding the pair of separation/supply rollers 3a, 3b since one of the rollers (3b) is rotated in a reverse direction to prevent the double-feed of originals (roller 3a is rotated in a normal direction), it is well known that the conveying speed of the original becomes smaller than the rotational speeds of the rollers 3a, 3b. These factors cause the improper supply of the original. When adequate conveying force is applied to the pair of convey rollers 4, the original can be conveyed at the desired speed thereafter.

In consideration of the above, in FIG. 1, an original tip end detection sensor $S_1$ is disposed at a position downstream of the pair of convey roller 4 (i.e., at a position where the conveying speed of the original is already stabilized). A control device 60 serves to judge whether the conveying time duration until the tip end of the original is detected by the tip end detection sensor $S_1$ is delayed or not with respect to the proper conveying time duration. If the conveyance delay occurs, such conveyance delay is recognized by the control device 60. Incidentally, the conveying time duration is a time interval from a time when the original supply start signal (pulse signal) is inputted to a time when the tip end of the original is detected by the sensor $S_1$.

If the conveyance delay is detected (by a comparison circuit or the like) on the basis of a tip end detection signal from the original tip end detection sensor $S_1$, the control device (control means) 60 controls the rotations of the pairs of convey rollers 4, 5 and 6 disposed upstream of the first original reading portion 31 to reduce or stop, or controls to delay the original supplying timing which will be described later.

If the conveyance delay of the original occurs, since the speed controls (speed reduction or stop controls) regarding the pairs of convey rollers 4, 5 and 6 disposed upstream of the first original reading portion 31 differ from each other in dependence upon the original one-face reading mode or the original both-face reading mode, and/or the size of the original entering into the reverse rotation original convey path b, c (a single original having full-size (large size) and two originals having half-size can enter into such a path), the respective controls on the basis of the mode or the original size will now be explained.

Figure 2A:
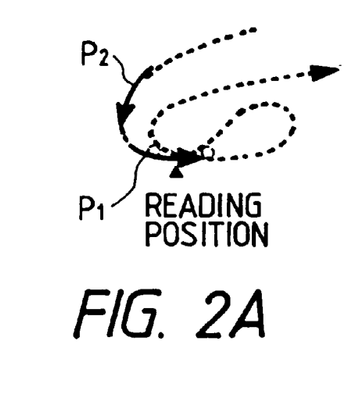
FIGS. 2A to 2C are views showing movements of originals in a one-face original convey mode.
Figure 2B:
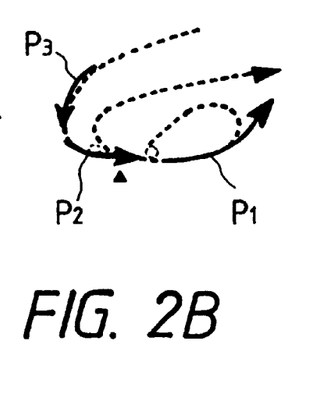
Figure 2C:
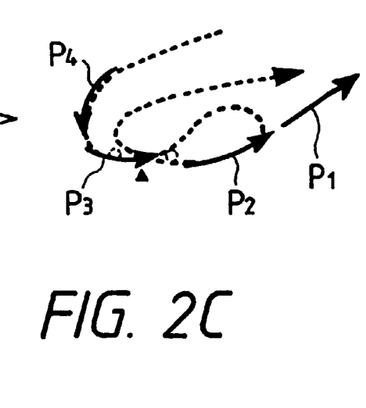

First of all, regarding the one-face reading mode, a way for handling the conveyance delay will be described. FIGS. 2A to 2C schematically show a condition that originals each having only a single imaged surface are being conveyed. In this case, when a first original or m-th original ($P_1$) is delayed with respect to the predetermined timing by $\Delta t$, if a second original or (m+1)-th original ($P_2$) is fed out at the predetermined timing, the distance between the first and second originals will become too short, thereby causing inconvenience. Or, if the value $\Delta t$ is too great, the predetermined timing for the second original will be elapsed while the first original is being supplied from the original stacking tray 1, thereby causing the double-feed of originals.

Figure 8:
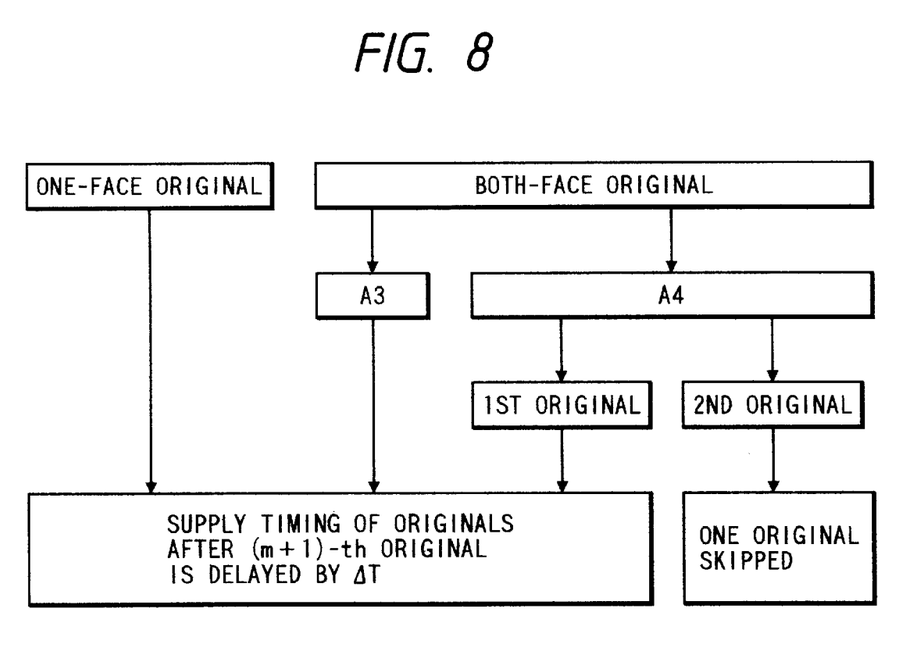
FIG. 8 is a function diagram of a conveying operation of the next original following an original having the conveyance delay.

To avoid this, after the supplying timing of the (m+1)-th original is delayed by $\Delta t$, the (m+1)-th original starts to be supplied (FIG. 8). Since the supplying timing (supplying interval) which corresponds to an interval between the pulse signals for the first and second originals is already determined on the basis of the original size by table-retrieval, when it is desired to delay the timing, a correction signal may be inputted (through a delay circuit). In this way, the generation of the pulse signal can be delayed by $\Delta t$.

Figure 3A:
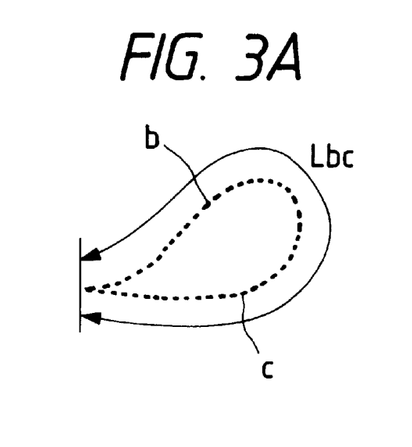
FIGS. 3A to 3C are views showing originals conveyed into a reverse rotation original convey path.
Figure 3B:
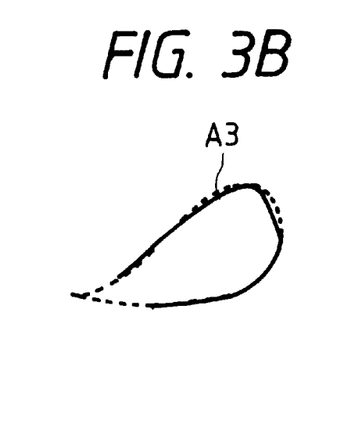

Next, regarding the both-face reading mode, a way for handling the conveyance delay will be described. Now, the reverse rotation original convey path used in the both-face regarding mode and constituted by the original convey paths b, c will be explained. As shown in FIG. 3A, the total length Lbc of the original convey paths b, c is 532 mm. Thus, for example, since A3 size original (full-size original) has a dimension of 420 mm×297 mm, only one full-size original can be introduced into the length Lbc (FIG. 3B).

FIGS. 4A to 4E show a condition that A3 size originals each having both imaged surfaces are being conveyed.

Figure 4A:
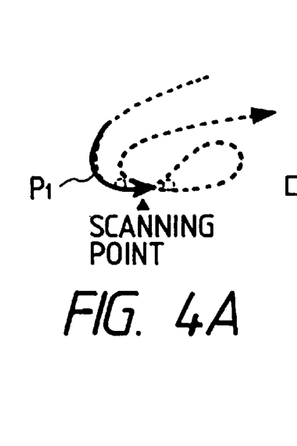
FIGS. 4A to 4F are views showing movements of both-face originals having a full-size (for example, A3 size) in the reverse rotation original convey path.
Figure 4B:
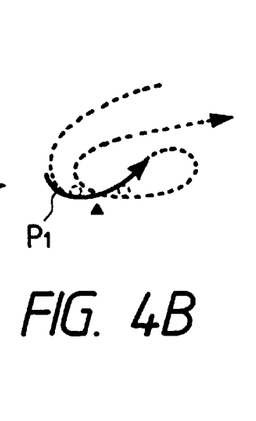
Figure 4C:
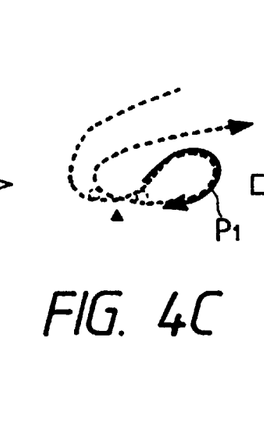
Figure 4D:
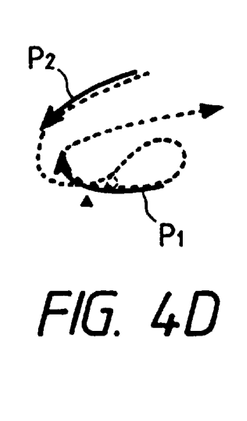
Figure 4E:
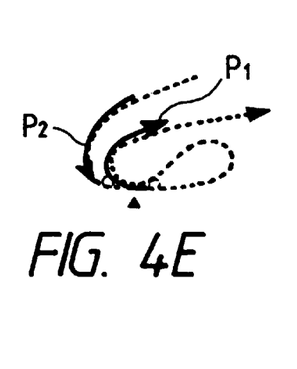
Figure 4F:
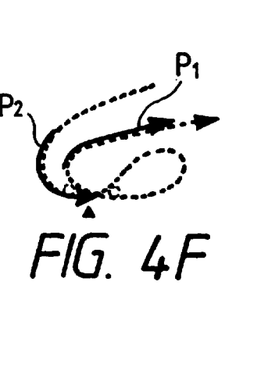

As shown in FIGS. 4A and 4B, the image on the front surface of an m-th original or first original $P_1$ is read by the first original reading portion 31. Thereafter, as shown in FIG. 4C, the original is turned up, and then, as shown in FIG. 4D, the original is re-supplied to the first original reading portion 31, where the image on the back surface of the original is read. Then, after the reading regarding the first original (preceding original) $P_1$ as shown in FIG. 4E, a second original (next or succeeding original) $P_2$ is conveyed to the first original reading portion 31, where the image on the front surface of the second original is read.

Figure 5:
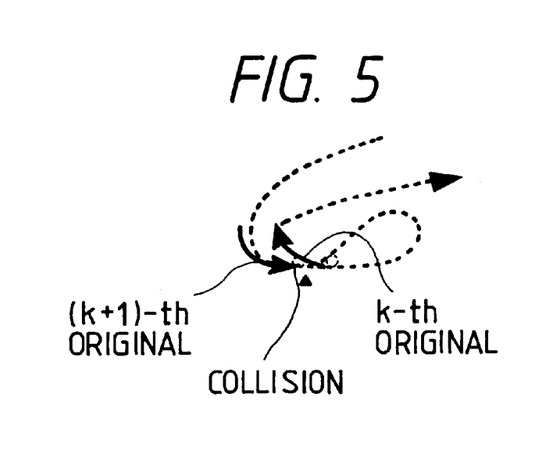
FIG. 5,is a view showing collision between the originals at a reading position.

In this case, if the m-th original is sent to the first original reading position 31 with any delay, the second original $P_2$ will be sent to the first original reading position at the timing as shown in FIG. 5 which is the timing for the first original, with the result that there occurs interference between the first and second originals $P_1$ and $P_2$ in the first original reading position. To avoid this, if the m-th original separated and supplied is conveyed with the conveyance delay (delayed from the predetermined timing) tending to cause the interference between the originals, as is in the one-face reading mode, the control means 60 effects the control in such a manner that the timings of the (m+1)-th original and other originals (A3 size both-face originals) are started to be delayed by Δt (FIG. 8). Since the supply interval has already been determined by the table retrieval on the basis of the original size, length of the reverse rotation convey path and distance between the originals, the delay can be achieved by inputting the correction signal.

Next, an example of an A4 size original (half-size original) will be explained.

Figure 3C:
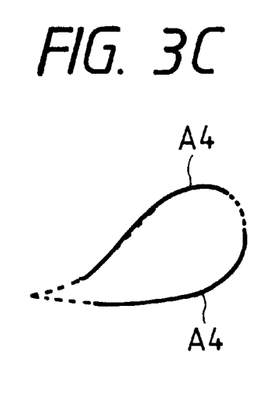

Since the A4 size original has a dimension of 210 mm×297 mm, as shown in FIG. 3C, two preceding and succeeding originals can be received in the convey length of Lbc. Thereinafter, the preceding original which is to be read firstly is referred to as "first original" and the succeeding original which is then to be read is referred to as "second original".

FIGS. 6A to 6E show a condition that the A4 size originals are being conveyed.

Figure 6A:
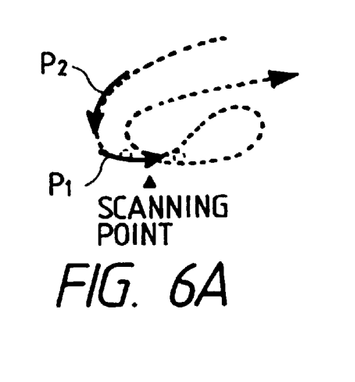
FIGS. 6A to 6E are views showing movements of both-face originals having a half-size (for example, A4 size) in the reverse rotation original convey path when conveyance delay is caused in a preceding original (first original)
Figure 6B:
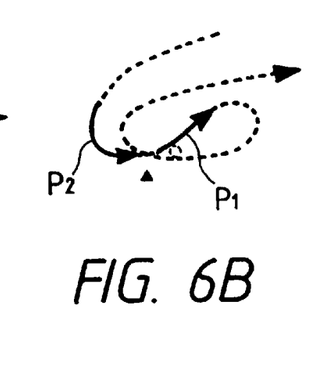
Figure 6C:
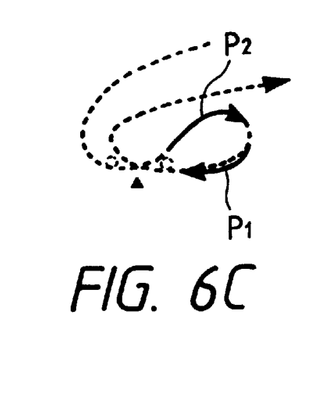
Figure 6D:
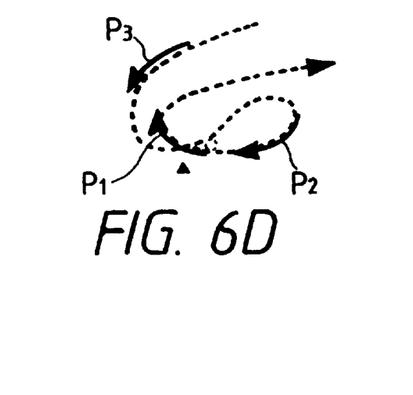
Figure 6E:
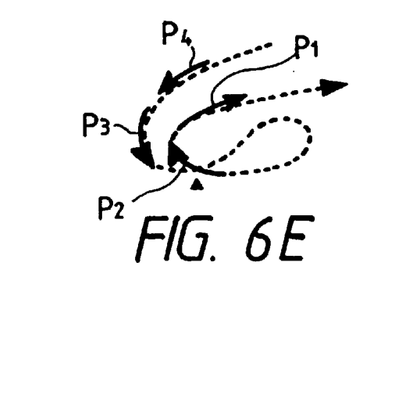

As shown in FIGS. 6A and 6B, the m-th original $P_1$ (shown as "first original" in the drawings) and (m+1)-th originals $P_2$ (front surfaces thereof) are successively read at the original reading position, and then, as shown in FIG. 6C, two originals are introduced into the reverse rotation original convey path, simultaneously. As shown in FIG. 6D, when the first and second originals $P_1$, $P_2$ are discharged from the reverse rotation original convey path, succeeding originals (third and fourth originals) $P_3$, $P_4$ are supplied to the original reading position, as shown in FIG. 6E.

That is to say, the supply distance between the first and second originals differs from the supply distance between the second and third originals. The supply distance between the second and third originals is determined in consideration of the length of the reverse rotation original convey path. If the conveyance delay Δt occurs regarding the first A4 size both-face original, the conveyance delay can be treated in the same manner as the one-face original.

On the other hand, if the conveyance delay Δt occurs regarding the second both-face original, the treatment is performed as shown in FIGS. 7A to 7E.

Figure 7A:
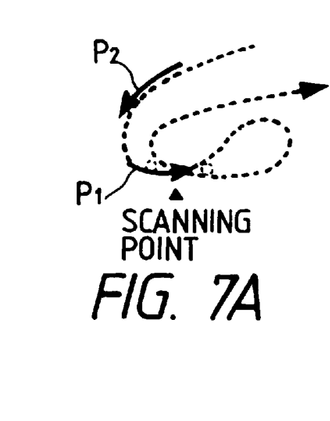
FIGS. 7A to 7E are views showing movements of both-face originals having a half-size (for example, A4 size) in the reverse rotation original convey path when conveyance delay is caused in a next original (second original)
Figure 7B:
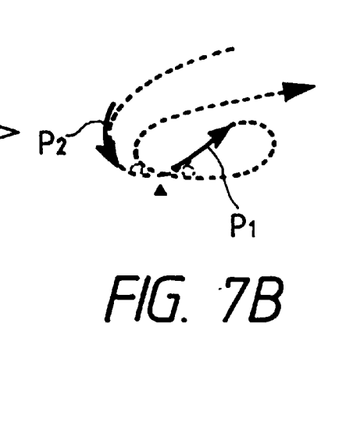
Figure 7C:
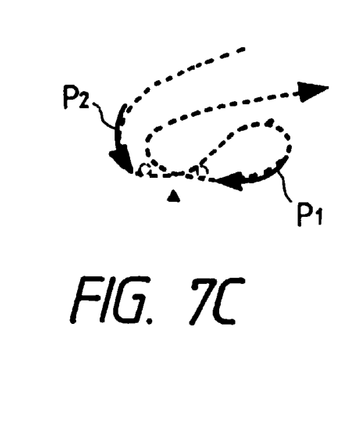
Figure 7D:
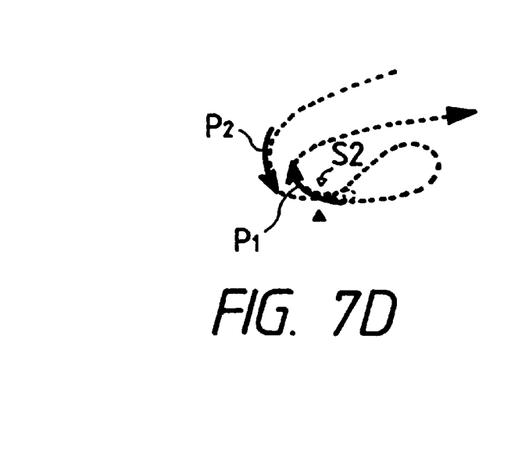

As shown in FIGS. 7A and 7B, if the m-th original (first original) $P_1$ is conveyed at the predetermined timing and the (m+1)-th original (second original) $P_2$ is conveyed with delay, the sheet supply roller 2, pair of separation/supply rollers 3 and pairs of convey rollers 4 to 6 are stopped so that the second original $P_2$ is stopped upstream of the original reading position not to enter into the reverse rotation original convey path. Although the first and second originals are normally turned-up simultaneously, in this case, as shown in FIGS. 7C and 7D, only the first original $P_1$ is turned-up and is then discharged from the reverse rotation original convey path.

Figure 7E:
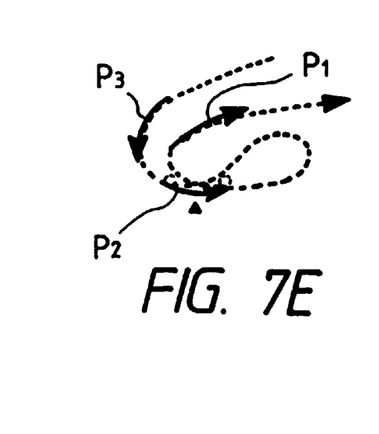

After the first original $P_1$ is discharged (i.e., after a trailing end of the first original leaves a sensor $S_2$), the second and third originals $P_2$, $P_3$ are successively introduced into the reverse rotation original convey path. That is to say, the second original $P_2$ is waiting until the timing for the next original $P_3$ is reached, and then, the second original is conveyed at the delayed timing corresponding to one original skip. Consequently, the second original $P_2$ can be regarded as a new first original ($P_1$) and the second original $P_2$ can be read at the original reading position without interference between the second original $P_2$ and the preceding original $P_1$.

As mentioned above, according to the first embodiment of the present invention, the "supply delay" can be achieved by delaying the supply timing, by decreasing the conveying speed, and/or by stopping the supply/conveyance temporarily.

Incidentally, when the conveyance delay of the preceding original is detected before the separation/supply of the next original is started, the separation/supply timing may be delayed. However, when the conveyance delay of the preceding original is detected after the separation/supply of the next original is started, the treatment can be performed by decreasing the conveying speed (of the convey rollers) or by stopping the convey rollers.

The conveyance delay includes both the supply delay in the original supplying operation and the conveyance delay in the original conveying operation. The conveyance delay in the original conveying operation can be detected not only by the sensor $S_1$ but also by a sensor (not shown) disposed in the reverse rotation original convey path.

Figure 9:
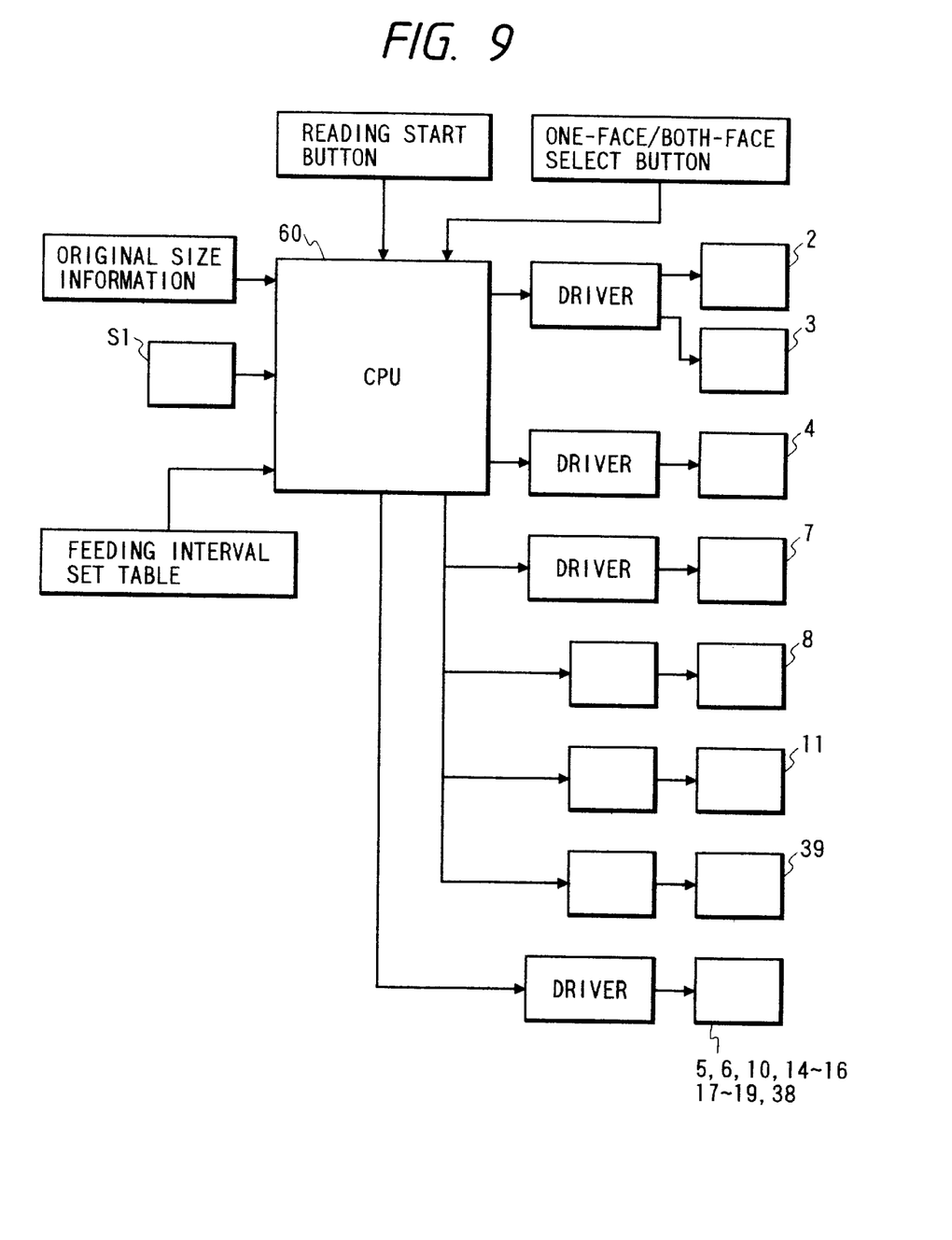
FIG. 9 is a block diagram.

FIG. 8 is a function diagram showing the abovementioned conveying operations, and FIG. 9 is a block diagram.

Other Embodiments

Figure 10:
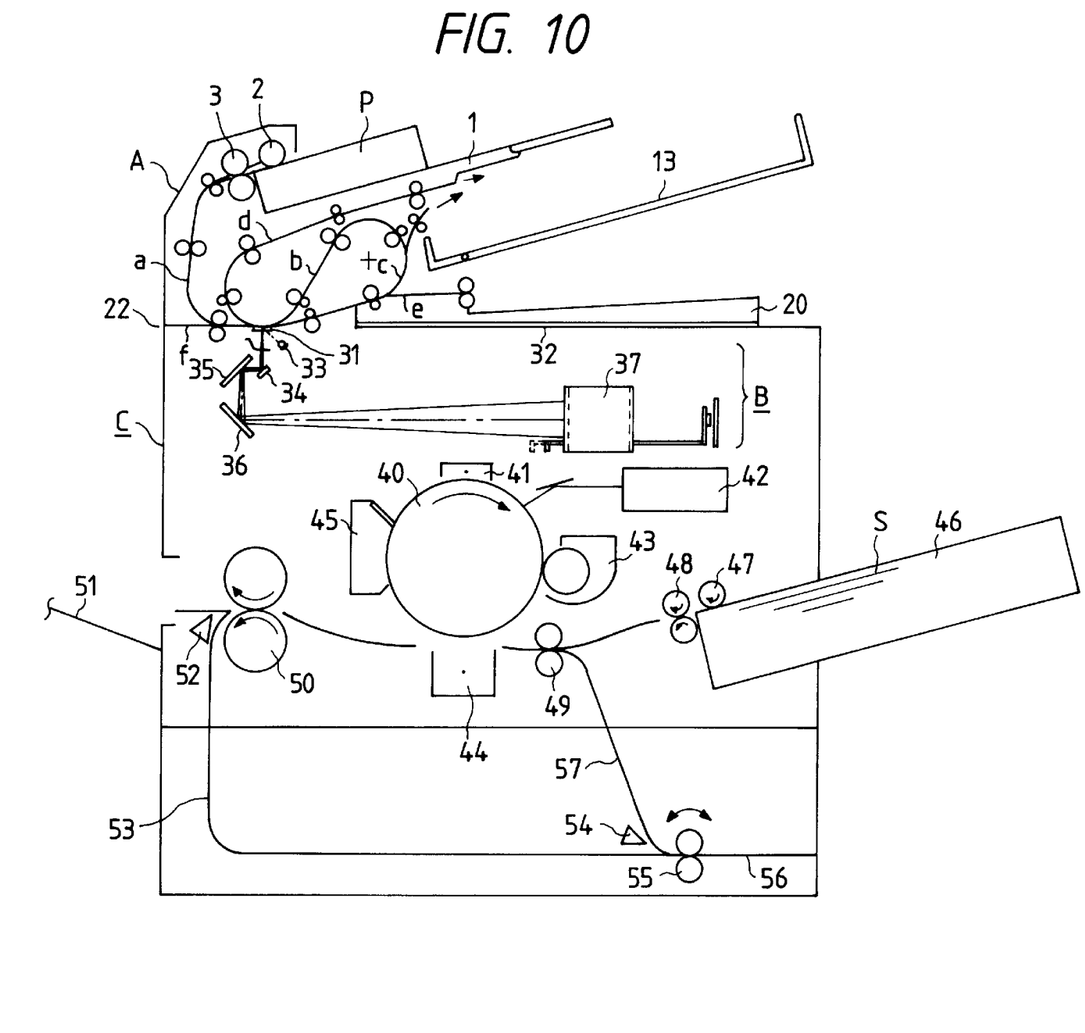
FIG. 10 is an elevational sectional view of an image forming apparatus having the automatic original reading apparatus with the automatic original feeding apparatus.

The original reading apparatus B can be incorporated into an image forming apparatus such as a copying machine, a printer and the like. FIG. 10 shows an example of such a case. In this embodiment, an image forming apparatus C is shown as a laser beam printer of electrophotographic process type. The original reading apparatus B is incorporated into this image forming apparatus C.

Further, the automatic original feeding apparatus A is pivotally mounted on an upper surface of the image forming apparatus C. In FIG. 10, the reference numeral 40 denotes a photosensitive drum (image forming portion); 41 denotes a first charger; 42 denotes a laser scanner; 43 denotes a developing device; 44 denotes a transfer charger; 45 denotes a cleaner; 46 denotes a sheet supply cassette; 47 denotes a sheet supply roller; 48 denotes a pair of convey rollers; 49 denotes a pair of regist rollers; 50 denotes a fixing device; and 51 denotes a sheet discharge tray. A reverse rotation/re-supply path mechanism portion 52 to 57 for a both-face print mode includes a first flapper 52, a sheet path 53, a second flapper 54, a pair of switch-back rollers (reversible rollers) 55, a switch-back path 56 and a re-supply path 57. Since an image forming process and an operation of the reverse rotation/re-supply path mechanism portion are well known, explanation thereof will be omitted.

What is claimed is:

1. An automatic original feeding apparatus comprising:
    an original reading portion;
    first feed means disposed upstream of said original reading portion;

second feed means capable of receiving two originals simultaneously, said second feed means being disposed downstream of said original reading portion for turning up and re-supplying the two originals one after another to said original reading portion;

third feed means for directing the two originals re-supplied to said original reading portion to a discharge portion;

detection means for detecting delay in conveyance of a succeeding original; and control means for delaying the feeding of the succeeding original when the delay in conveyance is detected, and for introducing the succeeding original into said second feed means, after a preceding original in said second feed means is discharged from said second feed means.

2. An automatic original feeding apparatus according to claim 1, said control means comprising stop means for temporarily stopping the feeding of the original.

3. An automatic original feeding apparatus according to claim 1, said control means comprising means for decreasing a feeding speed of the original.

4. An automatic original feeding apparatus according to claim 1, said control means comprising delay means for delaying a feeding timing of the original.

5. An automatic original feeding apparatus according to claim 1, wherein the succeeding original and next original are fed as a set, and when these two originals are read and discharged, another two originals are fed.

6. An automatic original feeding apparatus according to claim 5, further comprising separation/supply means disposed upstream of said first feed means, said detection means being disposed between said separation/supply means and said first feed means.

7. An automatic original feeding apparatus according to claim 6, wherein said second feed means comprises a curved path of a length from an inlet to an outlet sufficient to contain the readable maximum size original and corresponding to a length of two sheets each having a half-length thereof.

8. An automatic original feeding apparatus comprising:
an original reading portion;
first feed means disposed upstream of said original reading portion;
separation/supply means disposed upstream of said first feed means;
second feed means disposed downstream of said original reading portion;
detection means disposed downstream of said separation/supply means and upstream of said original reading portion among said first feed means for detecting delay in conveyance of a preceding original; and
control means for delaying the feeding of a succeeding original when the delay in conveyance is detected.

9. An automatic original feeding apparatus according to claim 8, said control means comprising stop means for temporarily stopping the feeding of the original.

10. An automatic original feeding apparatus according to claim 8, said control means comprising means for decreasing a feeding speed of the original.

11. An automatic original feeding apparatus according to claim 8, said control means comprising delay means for delaying a feeding timing of the original.

12. An automatic original feeding apparatus comprising:
an original reading portion;
first feed means disposed upstream of said original reading portion;
second feed means capable of receiving two originals simultaneously, said second feed means being disposed downstream of said original reading portion for turning up and re-supplying the two originals one after another to said original reading portion;
third feed means for directing the two originals re-supplied to said original reading portion to a discharge portion;
detection means for detecting delay in conveyance of a preceding original; and
control means for delaying the feeding of a succeeding original when the delay in conveyance is detected.

13. An automatic original feeding apparatus according to claim 12, said control means comprising stop means for temporarily stopping the feeding of the original.

14. An automatic original feeding apparatus according to claim 12, said control means comprising means for decreasing a feeding speed of the original.

15. An automatic original feeding apparatus according to claim 12, said control means comprising delay means for delaying a feeding timing of the original.

16. An automatic original feeding apparatus according to claim 12, further comprising:
separation/supply means disposed upstream of said first feed means, said detection means being disposed downstream of said separation/supply means and upstream of said original reading portion, among said first feeding means.

17. An automatic original feeding apparatus according to claim 12, wherein, when an original having the conveyance delay is a succeeding original among the two originals, the succeeding original is delayed upstream of said original reading portion, and, after a preceding original among the two originals in said second feed means is discharged from said second feed means, said succeeding original is introduced into said second feed means.

18. An automatic original feeding apparatus according to claim 17, wherein said control means temporarily stops the feeding of the succeeding original.

19. An automatic original feeding apparatus according to claim 17, wherein said control means decreases a feeding speed of the succeeding original.

20. An automatic original feeding apparatus according to claim 17, wherein said control means delays a feeding timing of the succeeding original.

21. An automatic original reading apparatus comprising:
original reading means;
first feed means disposed upstream of said original reading means;
separation/supply means disposed upstream of said first feed means;
second feed means disposed downstream of said original reading means;
detection means disposed downstream of said separation/supply means and upstream of said original reading means among said first feed means for detecting delay in conveyance of a preceding original; and
control means for delaying the feeding of a succeeding original when the delay in conveyance is detected.

22. An automatic original reading apparatus according to claim 21, said control means comprising stop means for temporarily stopping the feeding of the original.

23. An automatic original reading apparatus according to claim 21, said control means comprising means for decreasing a feeding speed of the original.

24. An automatic original reading apparatus according to claim 21, said control means comprising delay means for delaying a feeding timing of the original.

25. An automatic reading apparatus comprising:

original reading means;

first feed means disposed upstream of said original reading means;

second feed means capable of receiving two originals simultaneously, said second feed means being disposed downstream of said original reading means for turning up and re-supplying the two originals one after another to said original reading means;

third feed means for directing the two originals re-supplied to said original reading means to a discharge portion;

detection means for detecting delay in conveyance of a preceding original; and control means for delaying the feeding of a succeeding original when the delay in conveyance is detected.

26. An image forming apparatus comprising:

original reading means;

first feed means disposed upstream of said original reading means;

separation/supply means disposed upstream of said first feed means;

second feed means disposed downstream of said original reading means;

detection means disposed downstream of said separation/supply means and upstream of said original reading means among said first feed means for detecting delay in conveyance of a preceding original;

control means for delaying the feeding of a succeeding original when the delay in conveyance is detected; and image forming means for forming an image on the original read by said original reading means on a sheet.

27. An image forming apparatus comprising:

original reading means;

first feed means disposed upstream of said original reading means;

second feed means capable of receiving two originals simultaneously, said second feed means being disposed downstream of said original reading means for turning up and re-supplying the two originals one after another to said original reading means;

third feed means for directing the two originals re-supplied to said original reading means to a discharge portion;

detection means for detecting delay in conveyance of a preceding original;

control means for delaying the feeding of a succeeding original when the delay in conveyance is detected; and image forming means for forming an image on the original read by said original reading means on a sheet.

* * * * *

UNITED STATES PATENT AND TRADEMARK OFFICE
CERTIFICATE OF CORRECTION

PATENT NO. : 5,907,759

DATED : May 25, 1999

INVENTOR(S) : MASAHIKO YASHIRO

It is certified that error appears in the above-identified patent and that said Letters Patent is hereby corrected as shown below:

<u>COLUMN 3,</u>
Line 28, "FIG. 5, is" should read --FIG. 5 is--.

<u>COLUMN 4,</u>
Line 29, "3a, to 3b" should read --3a, 3b to--.

<u>COLUMN 5,</u>
Line 59, "3b" should read --3b,--.

<u>COLUMN 6,</u>
Line 67, "$P_1$is" should read --$P_1$ is--.

<u>COLUMN 11,</u>
Line 4, "reading" should read --original reading--.

Signed and Sealed this

Fourteenth Day of December, 1999

Attest:

Q. TODD DICKINSON

*Attesting Officer*    *Acting Commissioner of Patents and Trademarks*